United States Patent

Yamazaki

[11] Patent Number: 5,151,980
[45] Date of Patent: Sep. 29, 1992

[54] BUFFER CONTROL CIRCUIT FOR DATA PROCESSOR

[75] Inventor: Atsushi Yamazaki, Tokyo, Japan

[73] Assignee: NEC Corporation, Tokyo, Japan

[21] Appl. No.: 837,607

[22] Filed: Feb. 21, 1992

Related U.S. Application Data

[63] Continuation of Ser. No. 348,507, May 8, 1989, abandoned.

[30] Foreign Application Priority Data

May 11, 1988 [JP] Japan .................. 63-114386

[51] Int. Cl.⁵ .............................. G06F 9/30
[52] U.S. Cl. .................. 395/375; 364/938; 364/261.3; 364/239; 364/939
[58] Field of Search .......................... 395/375

[56] References Cited

U.S. PATENT DOCUMENTS

| | | | |
|---|---|---|---|
| 4,742,451 | 5/1988 | Bruckert et al. | 364/200 |
| 4,881,194 | 11/1989 | Sprague et al. | 364/900 |
| 4,933,841 | 6/1990 | Mori | 364/200 |
| 4,992,932 | 2/1991 | Ohshima | 364/200 |

Primary Examiner—David Y. Eng
Attorney, Agent, or Firm—Foley and Lardner

[57] ABSTRACT

A buffer control circuit for a data processor which includes an operand buffer for storing operand data, and an instruction buffer for storing prefetched instruction data. The buffer control circuit includes a writing section and an outputting section. When an instruction decode signal is a branch instruction, the writing section reads out instruction data at a branch destination from a main memory and writes the instruction data in the operand buffer. When satisfaction of a condition of the branch instruction is signaled, the outputting section reads out the instruction data at the branch destination written in the operand buffer by the writing section and outputs the instruction data to an operating unit.

1 Claim, 2 Drawing Sheets

BUFFER CONTROL CIRCUIT FOR DATA PROCESSOR

This application is a continuation of application Ser. No. 07/348,507, filed May 8, 1989, now abandoned.

BACKGROUND OF THE INVENTION

The present invention relates to a buffer control circuit and, more particularly, to a buffer control circuit used for a data processor comprising an operand buffer and an instruction buffer for instruction prefetch.

As shown in FIG. 2, a conventional buffer control circuit comprises an operand buffer 21, an instruction buffer 22, an operand buffer control circuit 23, an instruction buffer control circuit 24, an operand data aligning circuit 15, and an instruction data aligning circuit 16.

Operand data designated by an instruction is read out from a main memory (not shown), and is supplied to the operand buffer 21 as main memory readout data 101. In response to an operand data storage command signal 102 supplied together with the readout data 101, the operand buffer 21 stores the readout data 101 at an address designated by an operand buffer write address 112 from the operand buffer control circuit 23.

The operand data stored in the operand buffer 21 is read out from an address designated by an operand buffer read address 114 from the operand buffer control circuit 23, and is output to the operand data aligning circuit 15 as an operand buffer output signal 108.

In response to an operand data alignment command signal 110 from the operand buffer control circuit 23, the operand data aligning circuit 15 aligns an operand buffer output signal 108 from the operand buffer 21 and outputs an alignment result to the operating unit as operand data 106.

Instruction data is read out from the main memory and is supplied to the instruction buffer 21 as the main memory readout data 101. In response to an instruction data storage command signal 103 supplied together with the readout data 101, the instruction buffer 22 stores the readout data 101 at an address designated by an instruction write address 113 from the instruction buffer control circuit 24.

When an instruction decode signal 104 input to the instruction buffer control circuit 24 represents an instruction other than a branch instruction, the instruction data stored in the instruction buffer 22 is read out from an address designated by an instruction buffer read address 115 from the instruction buffer control circuit 24, and is output to the instruction data aligning circuit 16 as an instruction buffer output signal 109.

In response to an instruction data alignment command signal 111 from the instruction buffer control circuit 24, the instruction data aligning circuit 16 aligns the instruction buffer output signal 109 from the instruction buffer 22, and outputs the alignment result to the operating unit as instruction data 107.

If the instruction decode signal 104 supplied to the instruction buffer control circuit 24 represents a branch instruction, and a branch condition satisfaction signal 105 from the operating unit represents that a given condition is not satisfied, the instruction buffer control circuit 24 outputs the instruction buffer read address 115 to the instruction buffer 22 and outputs the instruction data alignment command signal 111 to the instruction data aligning circuit 16.

In response to the instruction data alignment command signal 111 from the instruction buffer control circuit 24, the instruction data aligning circuit 16 aligns the instruction buffer output signal 109 from the instruction buffer 22, and outputs the alignment result to the operating unit as the instruction data 107.

If the branch condition satisfaction signal 105 represents that a given condition is satisfied, the instruction buffer control circuit 24 initializes the instruction buffer write address 113 and the instruction buffer read address 115 and outputs a read command signal 116 for reading out instruction data at a branch destination to the main memory.

After the instruction data at the branch destination is read out from the main memory in response to the read command signal 116 and is stored in the instruction buffer 22, the instruction buffer read address 115 is output from the instruction buffer control circuit 24 to the instruction buffer 22. At the same time, the instruction data alignment command signal 111 is output to the instruction data aligning circuit 16, and the instruction buffer output signal 109 supplied from the instruction buffer 22 and aligned by the instruction data aligning circuit 16 is output to the operating unit as the instruction data 107.

In such a conventional buffer control circuit, when a branch instruction is to be processed, since instruction data at a branch destination cannot be obtained from the main memory until satisfaction of a given branch condition is confirmed by the branch condition satisfaction signal 105 from the operating unit, execution efficiency of branch instructions is decreased.

SUMMARY OF THE INVENTION

The present invention has been made to eliminate the above-described conventional drawback, and has as its object to provide a buffer control circuit capable of increasing execution efficiency of branch instructions.

According to the present invention, in order to achieve the above object, there is provided a buffer control circuit for a data processor including an operand buffer for storing operand data, and an instruction buffer for storing prefetched instruction data, comprising write means for reading out instruction data at a branch destination from a main memory and writing the instruction data in the operand buffer when an instruction decode signal is a branch instruction, and output means for reading out the instruction data at the branch destination written in the operand buffer by the write means and outputting the instruction data to an operating unit when satisfaction of a condition of the branch instruction is signaled.

BRIEF DESCRIPTION OF THE DRAWINGS

FIG. 3 is a block diagram showing an arrangement of a prior art.

DETAILED DESCRIPTION OF THE PREFERRED EMBODIMENT

An embodiment of the present invention will be described below with reference to the accompanying drawings.

Figure 1:
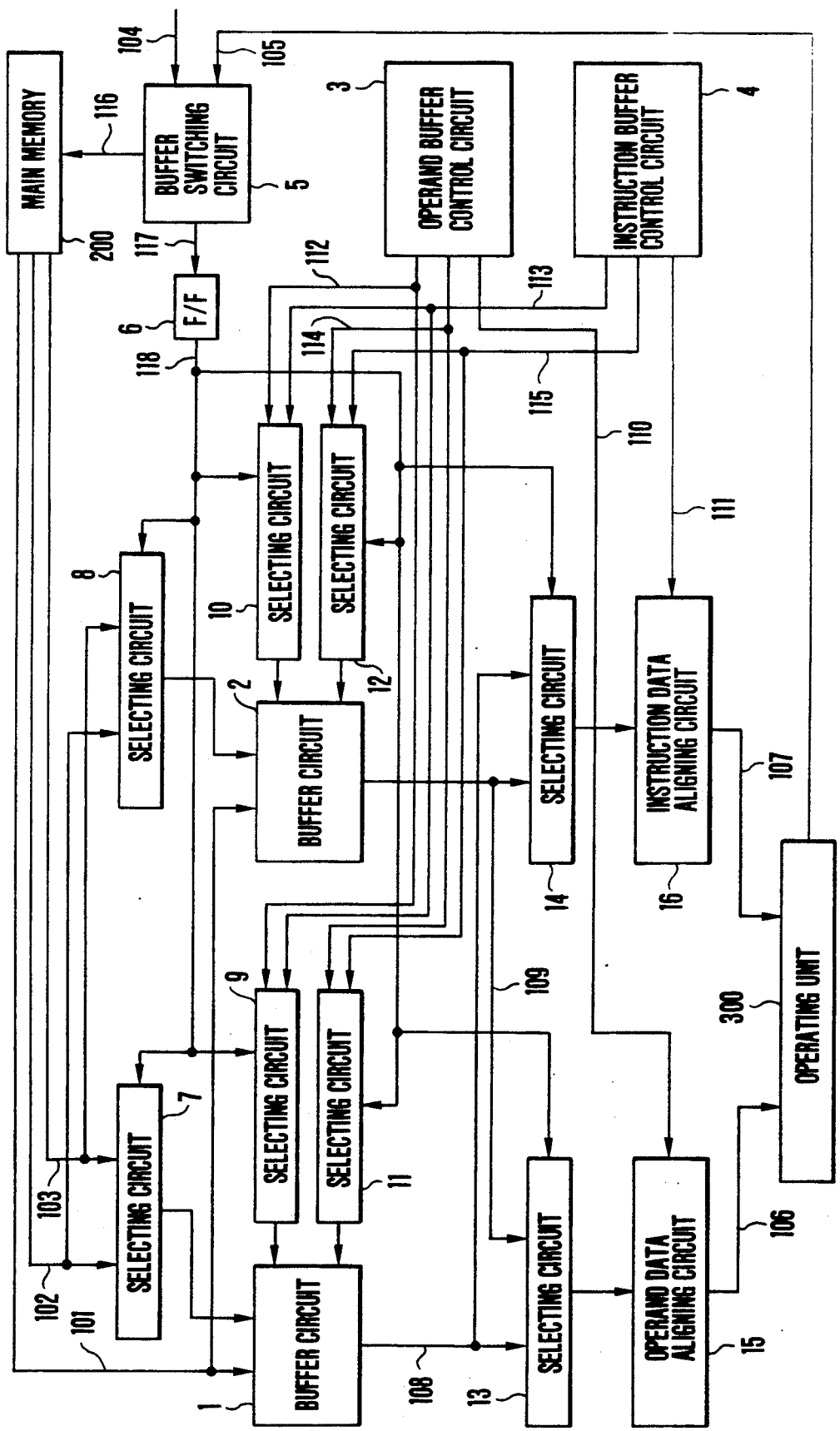
FIG. 1 is a block diagram showing an arrangement of an embodiment of the present invention.

FIG. 1 shows an arrangement of the embodiment of the present invention. Referring to FIG. 1, a buffer control circuit of the embodiment comprises buffer circuits 1 and 2, an operand buffer control circuit 3, an instruction buffer control circuit 4, a buffer switching circuit 5, a buffer switching flip-flop (to be referred to as a buffer switching FF hereinafter) 6, selecting circuits 7 to 14, an operand data aligning circuit 15, and an instruction data aligning circuit 16.

The buffer circuits 1 and 2 receive main memory readout data 101 from a main memory 200, and respectively store operand data or instruction data at addresses designated by address signals from the selecting circuits 9 and 10 in response to storage command signals from the selecting circuits 7 and 8.

Buffer output signals 108 and 109 read out from addresses of the buffer circuits 1 and 2, which are designated by address signals from the selecting circuits 11 and 12, are respectively output to the selecting circuits 13 and 14 to be selected thereby and input to the operand data aligning circuit 15 or the instruction data aligning circuit 16.

The operand buffer control circuit 3 outputs an operand buffer write address signal 112 to the selecting circuits 9 and 10. At the same time, the circuit 3 outputs an operand buffer read address signal 114 to the selecting circuits 11 and 12, and outputs an operand data alignment command signal 110 to the operand data aligning circuit 15.

The instruction buffer control circuit 4 outputs an instruction buffer write address signal 113 to the selecting circuits 9 and 10, and outputs an instruction buffer read address signal 115 to the selecting circuits 11 and 12. At the same time, the circuit 4 outputs an instruction data alignment command signal 111 to the instruction data aligning circuit 16.

The buffer switching circuit 5 receives a known instruction decode signal 104 supplied from a controller or a CPU (not shown) and a branch condition satisfaction signal 105 supplied from an operating unit 300, and outputs a read command signal 116 and a flip-flop update command signal 117 to the main memory 200 and the buffer switching FF 6, respectively.

The buffer switching FF 6 outputs a buffer switching command signal 118 to the selecting circuits 7 to 14. In response to the command signal 117 from the buffer switching circuit 5, the contents held by the buffer switching FF 6 are inverted.

In response to the buffer switching command signal 118 from the buffer switching FF 6, the selecting circuits 7 and 8 select either of the operand data storage command signal 102 and the instruction data storage command signal 103 from the main memory 200, and respectively output the selected signals to the buffer circuits 1 and 2 as storage command signals. In this case, when the selecting circuit 7 selects the operand data storage command signal 102, the selecting circuit 8 selects the instruction data storage command signal 103. In the opposite case, the selecting circuits 7 and 8 select different signals in the same manner as described above.

In response to the buffer switching command signal 118 from the buffer switching FF 6, the selecting circuits 9 and 10 select either of the operand buffer write address signal 112 from the operand buffer control circuit 3 and the instruction buffer write address signal 113 from the instruction buffer control circuit 4, and respectively output the selected signals to the buffer circuits 1 and 2 as write address signals. In this case, when the selecting circuit 9 selects the operand buffer write address signal 112, the selecting circuit 10 selects the instruction buffer write address signal 113. In the opposite case, the selecting circuits 9 and 10 similarly select different signals.

In response to the buffer switching command signal 118 from the buffer switching FF 6, the selecting circuits 11 and 12 select either of the operand buffer read address signal 114 from the operand buffer control circuit 3 and the instruction buffer read address signal 115 from the instruction buffer control circuit 4, and respectively output the selected signals to the buffer circuits 1 and 2 as read address signals. In this case, when the selecting circuit 11 selects the operand buffer read address signal 114, the selecting circuit 12 selects the instruction buffer read address signal 115. In the opposite case, the selecting circuits 11 and 12 similarly select different signals.

In response to the buffer switching command signal 118 from the buffer switching FF 6, the selecting circuit 13 selects one of the buffer output signals 108 and 109 from the buffer circuits 1 and 2, and outputs the selected signal to the operand data aligning circuit 15 as an operand buffer output signal. In response to the command signal 118 from the FF 6, the selecting circuit 14 selects one of the buffer output signals 108 and 109 from the buffer circuits 1 and 2, and outputs the selected signal to the instruction data aligning circuit 16 as an instruction buffer output signal.

In response to the operand data alignment command signal 110 from the operand buffer control circuit 3, the operand data aligning circuit 15 aligns the operand buffer output signal from the selecting circuit 13, and outputs the alignment result to the operating unit 300 as operand data 106.

In response to the instruction data alignment command signal 111 from the instruction buffer control circuit 4, the instruction data aligning circuit 16 aligns the instruction buffer output signal from the selecting circuit 14, and outputs the alignment result to the operating unit 300 as instruction data 107.

If logic "1" is held in the buffer switching FF 6, the selecting circuit 7 selects the operand data storage command signal 102, and the selecting circuit 8 selects the instruction data storage command signal 103. In addition, the selecting circuit 10 selects the operand buffer write address signal 112, and the selecting circuit 10 selects the instruction buffer write address signal 113. As a result, the operand and instruction data are respectively stored in the buffer circuits 1 and 2.

Consequently, in order to read out the operand data from the buffer circuit 1 and the instruction data from the buffer circuit 2, the selecting circuit 11 selects the operand buffer read address signal 114, and the selecting circuit 12 selects the instruction buffer read address signal 115. With this operation, the buffer output signal read out from the buffer circuit 1 is selected by the selecting circuit 13. The selected signal 108 is then aligned by the operand data aligning circuit 15 as an operand buffer output signal, and is supplied to the operating unit 300 as the operand data 106.

The buffer output signal 109 read out from the buffer circuit 2 is selected by the selecting circuit 14. The selected signal 109 is aligned by the instruction data aligning circuit 16 as an instruction buffer output signal, and is supplied to the operating unit 300 as the instruction data 107.

Figure 2:
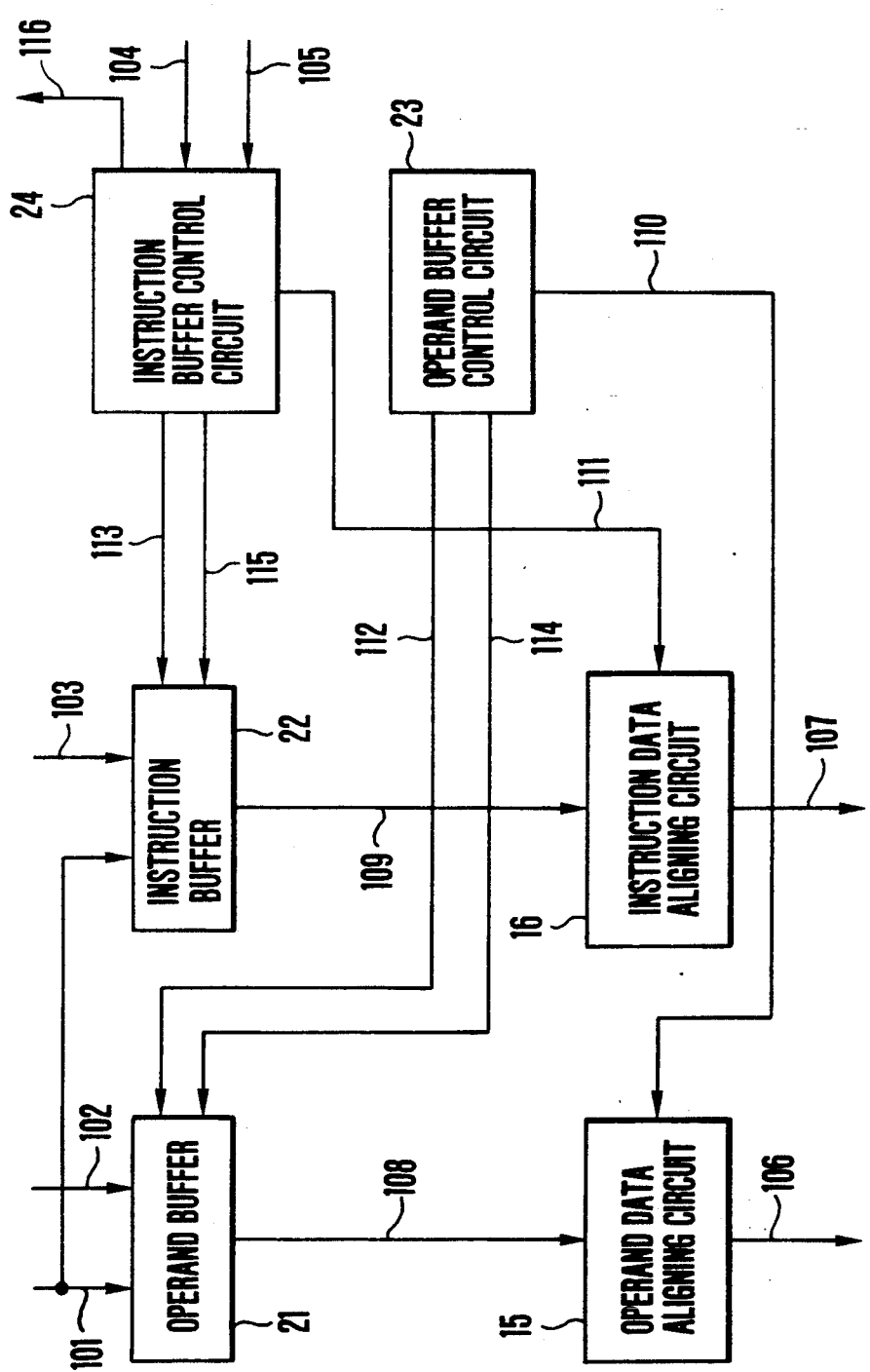

That is, the buffer circuit 1 functions as an operand buffer; and the buffer circuit 2, an instruction buffer. In this case, if the instruction decode signal 104 represents an instruction other than a branch instruction, or the branch condition of a branch instruction is not satisfied, the same processing as described in the prior art shown in FIG. 2 is performed. Hence, a description of the processing in these cases will be omitted.

Assume that while the buffer circuits 1 and 2 function as described above, the buffer switching circuit 5 detects a branch instruction by monitoring the instruction decode signal 104. In this case, in order to prefetch instruction data at a branch destination from the main memory 200, the buffer switching circuit 5 outputs the read command signal 116 to the main memory 200 before it is confirmed that the branch condition of the branch instruction is or is not satisfied. In this case, an operand data code is added to the read command signal 116 so as to cause the instruction data at the branch destination prefetched from the main memory 200 to be stored in the operand buffer side (buffer circuit 1 side).

Operand data and instruction data are normally read out from the main memory 200 in the same operation. Therefore, a code for indicating that data to be read out is operand data or instruction data is added to the read command signal 116 output from the buffer switching circuit 5. With this operation, the readout data 101 from the main memory 200 is supplied together with the operand data storage command signal 102 and the instruction data storage command signal 103. Therefore, if a code to be added to the read command signal 116 is changed, the storage address of data can be changed.

Subsequently, when the branch condition satisfaction signal 105 from the operating unit 300 is supplied to the buffer switching circuit 5, and satisfaction of a given branch condition is signaled, the circuit 5 outputs the buffer switching flip-flop update command signal 117 to the buffer switching FF 6, thereby inverting the contents held in the FF 6.

With this operation, the buffer switching command signal 118 from the FF 6 is set at logic "0". As a result, the selecting circuit circuit 7 selects the instruction data storage command signal 103; the selecting circuit 8, the operand data storage command signal 102; the selecting circuit 9, the instruction buffer write address signal 113; the selecting circuit 10, the operand buffer write address signal 112; the selecting circuit 11, the instruction buffer read address signal 115; the selecting circuit 12, the operand buffer read address signal 114; the selecting circuit 13, the buffer output signal 109; and the selecting circuit 14, the buffer output signal 108.

Since the buffer circuits 1 and 2 respectively function as instruction and operand buffers, an alignment result obtained by aligning the buffer output signal 108 from the buffer circuit 1 using the instruction data aligning circuit 16, i.e., the instruction data at the branch destination, which is stored in the buffer circuit 1 is supplied to the operating unit as the instruction data 107 after the branch condition is satisfied.

Subsequently, the buffer circuits 1 and 2 respectively keep functioning as instruction and operand buffers until the branch condition of the next branch instruction is satisfied. After the condition is satisfied, their functions are exchanged.

Each of the buffer circuits 1 and 2 can be used as an operand buffer or an instruction buffer by utilizing the selecting circuits 7 to 14 in this manner. When a branch instruction is to be executed, instruction data at a branch destination is fetched from the main memory and is stored in one of the buffer circuits, which functions as an operand buffer, before it is confirmed that a given branch condition is or is not satisfied. After the branch condition is satisfied, the instruction data at the branch destination is read out from the buffer circuit. With this operation, the instruction data at the branch destination can be fetched from the main memory before satisfaction of the branch condition is confirmed. The branch instruction can be executed by using the instruction data at the branch destination immediately after the branch condition is satisfied. Therefore, with a slight increase in hardware amount, execution efficiency of branch instructions can be increased.

In the embodiment of the present invention, the initial value of the buffer switching FF 6 is set to be logic "1". However, it is apparent that this initial value can be set to be logic "0".

As has been described above, according to the present invention, when an instruction decode signal is detected to be a branch instruction, instruction data at a branch destination is read out from the main memory and is written in an operand buffer. When a given branch condition is satisfied, the instruction data at the branch destination, which is written in the operand buffer, is read out and is output to the operating unit, thereby increasing execution efficiency of branch instructions.

What is claimed is:

1. A buffer control circuit for a data processor, said buffer control circuit comprising:
   a buffer switching flip-flop, said buffer switching flip-flop inverting its output whenever a branch condition of a conditional branch instruction is satisfied;
   a first buffer circuit selectively serving as an instruction buffer and as an operand buffer in accordance with said output of said buffer switching flip-flop;
   a second buffer circuit serving as an operand buffer when said first buffer circuit serves as an instruction buffer and serving as an instruction buffer when said first buffer circuit serves as an operand buffer;
   writing means for reading out prefetched instruction data at a branch destination from a main memory and for writing said instruction data into one of said first and second buffer circuits serving as an operand buffer when an instruction decode signal indicates a branch instruction; and
   buffer selecting means for selecting one of said first and second buffer circuits serving as an operand buffer, for reading out instruction data at said branch destination from the selected buffer circuit, and for outputting said instruction data to an operating unit in accordance with said output of said buffer switching flip-flop when satisfaction of a condition of said branch instruction is signaled.

* * * * *